United States Patent
Hall, Jr. et al.

(10) Patent No.: US 6,621,530 B1
(45) Date of Patent: *Sep. 16, 2003

(54) PROJECTION TELEVISIONS WITH MIRRORS INCIDENT ON HOLOGRAPHIC SCREENS

(75) Inventors: Estill Thone Hall, Jr., Fishers, IN (US); Wendy Rene Pfile, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,510

(22) PCT Filed: Jan. 29, 1998

(86) PCT No.: PCT/US98/01737
§ 371 (c)(1),
(2), (4) Date: Jul. 18, 2000

(87) PCT Pub. No.: WO99/39514
PCT Pub. Date: Aug. 5, 1999

(51) Int. Cl.[7] .............................................. H04N 15/00
(52) U.S. Cl. .................... 348/781; 348/40; 348/744; 345/6; 345/419; 359/10; 359/456
(58) Field of Search .......................... 348/781, 40, 41, 348/744, 745, 746, 747, 778, 779, 780, 785, 786; 345/6, 419; 359/1, 10, 22, 455, 456, 443, 460; H04N 15/00

(56) References Cited

U.S. PATENT DOCUMENTS

| | | | |
|---|---|---|---|
| 4,432,010 A | | 2/1984 | Oguino |
| 4,536,056 A | | 8/1985 | Oguino |
| 5,046,793 A | | 9/1991 | Hockley et al. |
| 5,196,960 A | | 3/1993 | Matsuzaki et al. |
| 5,274,478 A | * | 12/1993 | Yang ............................. 359/15 |
| 5,537,232 A | * | 7/1996 | Biles ............................ 359/15 |
| 5,613,748 A | | 3/1997 | Yoshida et al. |
| 6,078,351 A | * | 6/2000 | Hall et al. ..................... 348/40 |
| 6,392,767 B2 | * | 5/2002 | Kanda et al. .................. 359/15 |
| 6,400,417 B1 | * | 6/2002 | Hall et al. ................... 348/656 |
| 6,437,914 B1 | * | 8/2002 | Hall et al. ................... 359/457 |
| 6,483,533 B1 | * | 11/2002 | Hall et al. ..................... 348/40 |

FOREIGN PATENT DOCUMENTS

| | | |
|---|---|---|
| EP | 0463888 | 1/1992 |
| JP | 5-53195 | 3/1993 |
| JP | 6-082625 | 3/1994 |
| JP | 9-114354 | 5/1997 |
| JP | 9-073132 | 8/1997 |
| WO | 95/04303 | 2/1995 |
| WO | 96/07953 | 3/1996 |

OTHER PUBLICATIONS

Patent Abstracts of Japan, vol. 97, No. 7, Jul. 31, 1997 and JP 9–073132 (see ref. AF).
Patent Abstracts of Japan, vol. 18, No. 333, Jun. 23, 1994 and JP 6–082625 (see ref. AG).
Patent Abstracts of Japan, vol. 17, No. 360 and JP 5–053195 (see ref. AI).
Patent Abstracts of Japan, vol. 97, No. 9 and JP 9–114354 (see ref. AJ).

* cited by examiner

*Primary Examiner*—John Miller
*Assistant Examiner*—Brian P. Yenke
(74) *Attorney, Agent, or Firm*—Joseph S. Tripoli; Joseph J. Laks; Harvey D. Fried

(57) ABSTRACT

A projection television has a screen with a three dimensional hologram on a film substrate for collecting light over a range of incident angles and redirecting the light more nearly forward. Vertical and horizontal holograms can have varying gain across a horizontal viewing span of ±40° and a vertical viewing span of ±20° can be stacked. Image projection tubes project an image onto at least one mirror that reflects the image along an optical path that converges at an angle of projection, $\phi$, between about 0° and 30° relative to an axis orthogonal to the screen. Each tube can have a separate mirror. The hologram redirects the images reflected to an angle of display relative to the orthogonal axis of the screen of from 0 to 5°. The hologram also forms an interference pattern effective to minimize color shift that otherwise occurs in displayed images due to off axis projection, achieving a color shift between two and five for angles of incidence between about 0° and 30°.

9 Claims, 9 Drawing Sheets

PROJECTION TELEVISIONS WITH MIRRORS INCIDENT ON HOLOGRAPHIC SCREENS

BACKGROUND

1. Field of the Invention

This invention relates to the field of projection television receivers, and in particular to a projection television receiver having projection sources oriented toward at least one mirror that directs light onto the rear of a holographic screen. The holographic screen collects light over a range of angles of incidence and redirects the light more parallel to an orthogonal axis relative to the screen. The holographic screen in combination with one or more mirrors provides significantly reduced color shift, improves brightness and enables significantly reduced cabinet depth.

2. Background Information

Color shift is defined as the change in the red/blue or green/blue ratio of a white image formed at the center of a projection screen by projected images from red, green and blue projection tubes, when viewed at different angles in the horizontal plane, by observations made at the peak brightness vertical viewing angle.

The color shift problem is caused by the need for at least three image projectors for respective images of different colors, for example, red, blue and green. A projection screen receives images from the at least three projectors on a first side and displays the images on a second side with controlled light dispersion of all the displayed images. One of the projectors, usually green and usually in the center of an array of projectors, has a first optical path in a substantially orthogonal orientation with the screen. At least two of the projectors, usually red and blue and usually positioned on opposite sides of the central green projector in the array, have respective optical paths converging toward the first optical path in a non orthogonal orientation defining angles of incidence, $\alpha$. Color shift results from the non orthogonal relationship of the red and blue projectors, relative to the screen and to the green projector. As a result of the color shift, color tones may differ at every position on the screen. The condition in which the color tone difference is large is often referred to as poor white uniformity. The smaller the color shift, the better the white uniformity.

Color shift is denoted by a scale of numbers, in which lower numbers indicate less color shift and better white uniformity. In accordance with a common procedure, values for the red, green and blue luminance are measured at the screen center from a variety of horizontal viewing angles, typically from at least about −40° to +40°, to as much as about −60° to +60°, in 5° or 10° increments. The positive and negative angles represent horizontal viewing angles to the right and left of screen center, respectively. These measurements are taken at the peak vertical viewing angle. The red, green and blue data is normalized to unity at 0°. One or both of the following equations (I) and (II) are evaluated at each angle:

$$C(\Theta) = 20 \cdot \log_{10}\left(\frac{red(\Theta)}{blue(\Theta)}\right); \quad (I)$$

$$C(\Theta) = 20 \cdot \log_{10}\left(\frac{green(\Theta)}{blue(\Theta)}\right) \quad (II)$$

where $\theta$ is any angle within a range horizontal viewing angles, $C(\theta)$ is the color shift at angle $\theta$, red($\theta$) is the red luminance level at angle $\theta$, blue($\theta$) is the blue luminance level at angle $\theta$ and green($\theta$) is the green luminance level at angle $\theta$. The maximum of these values is the color shift of the screen.

In general, color shift-should be no larger than 5, nominally, on any commercially acceptable screen design. Other engineering and design constraints may sometimes require that the color shift be somewhat higher than 5, although such color shift performance is not desirable and usually results in a perceptibly inferior picture with poor white uniformity.

Screens for projection television receivers are generally manufactured by an extrusion process utilizing one or more patterned rollers to shape the surface of a thermoplastic sheet material. The configuration is generally an array of lenticular elements, also referred to as lenticules and lenslets. The lenticular elements may be formed on one or both sides of the same sheet material or on one side only of different sheets which can then be permanently combined as a laminated unit or otherwise mounted adjacent to one another so as to function as a laminated unit. In many designs, one of the surfaces of the screen is configured as a Fresnel lens to provide light diffusion. Prior art efforts to reduce color shift and improve white uniformity have focused exclusively on two aspects of the screen. One aspect is the shape and disposition of the lenticular elements. The other aspect is the extent to which the screen material, or portions thereof, are doped with light diffusing particles to control light diffusion. These efforts are exemplified by the following patent documents.

In U.S. Pat. No. 4,432,010 and U.S. Pat. No. 4,536,056, a projection screen includes a light-transmitting lenticular sheet having an input surface and an exit surface. The input surface is characterized by horizontally diffusing lenticular profiles having a ratio of a lenticulated depth Xv to a close-axis-curvature radius R1 (Xv/R1) which is within the range of 0.5 to 1.8. The profiles are elongated along the optical axis and form aspherical input lenticular lenses.

The use of a screen with a double sided lenticular lens is common. Such a screen has cylindrical entrance lenticular elements on an entrance surface of the screen, cylindrical lenticular elements formed on an exit surface of the screen and a light absorbing layer formed at the light non convergent part of the exit surface. The entrance and the exit lenticular elements each have the shape of a circle, ellipse or hyperbola represented by the following equation (III):

$$Z(x) = \frac{Cx^2}{1+[1-(K+1)C^2x^2]^{\frac{1}{2}}} \quad (III)$$

wherein C is a main curvature and K is a conic constant.

Alternatively, the lenslets have a curve to which a term with a higher order than 2nd order has been added.

In screens making use of such a double sided lenticular lens, it has been proposed to specify the position relationship between the entrance lens and exit lens, or the lenticular elements forming the lenses. It has been taught, for example in U.S. Pat. No. 4,443,814, to position the entrance lens and exit lens in such a way that the lens surface of one lens is present at the focal point of the other lens. It has also been taught, for example in JP 58-59436, that the eccentricity of the entrance lens be substantially equal to a reciprocal of the refractive index of the material constituting the lenticular lens. It has further been taught, for example in U.S. Pat. No. 4,502,755, to combine two sheets of double-sided lenticular lenses in such a way that the optic axis planes of the respective lenticular lenses are at right angles with respect to one another, and to form such double sided lenticular lenses in such a way that the entrance lens and exit lens at the periphery of one of the lenses are asymmetric with respect to the optic axis. It is also taught, in U.S. Pat. No. 4,953,948, that the position of light convergence only at the valley of an entrance lens should be offset toward the viewing side from the surface of an exit lens so that the tolerance for misalignment of optic axes and the difference in thickness can be made larger or the color shift can be made smaller.

In addition to the various proposals for decreasing the color shift or white non uniformity, other proposals for improving projection screen performance are directed to brightening pictures and ensuring appropriate visual fields in both the horizontal and vertical directions. A summary of many such proposals can be found in U.S. Pat. No. 5,196,960, which itself teaches a double sided lenticular lens sheet comprising an entrance lens layer having an entrance lens, and an exit lens layer having an exit lens whose lens surface is formed at the light convergent point of the entrance lens, or in the vicinity thereof, wherein the entrance lens layer and the exit lens layer are each formed of a substantially transparent thermoplastic resin and at least the exit layer contains light diffusing fine particles and wherein a difference exists in the light diffusion properties between the entrance lens layer and the exit lens layer. A plurality of entrance lenses comprise a cylindrical lens. The exit lens is formed of a plurality of exit lens layers, each having a lens surface at the light convergent point of each lens of the entrance lens layer, or in the vicinity thereof. A light absorbing layer is also formed at the light non convergent part of the exit lens layer. This screen design is said to provide sufficient horizontal visual field angle, decreased color shift and a brighter picture, as well as ease of manufacture by extrusion processes.

Despite many years of aggressive developments in projection screen design, the improvements have been incremental, at best. Moreover, there has been no success in surpassing certain benchmarks. The angle of incidence defined by the geometric arrangement of the image projectors, referred to as angle $\alpha$ herein, has generally been limited to the range of greater than 0° and less than or equal to about 10° or 11°. The size of the image projectors and/or their optics, makes angles of $\alpha$ close to 0° essentially impossible. In the range of the angles of $\alpha$ less than about 10° or 11°, the best color shift performance which has been achieved is about 5, as determined in accordance with equations (I) and (II). In the range of the angles of a greater than about 10° or 11°, the best color shift performance which has been achieved is not commercially acceptable. In fact, projection television receivers having angles of $\alpha$ greater than 10° or 11° are not known to have been marketed.

Small angles of $\alpha$ have a significant and undesirable consequence, namely a very large cabinet depth is needed to house a projection television receiver. The large depth is a direct result of the need to accommodate optical paths having small angles of incidence ($\alpha$). For a given size of the image projectors and optical elements, the angle of incidence can be reduced only by increasing the length of the optical path between the image projectors or their optics and the screen.

Techniques for reducing the size of projection television cabinets generally rely on mirrors for folding long optical paths. The color shift success of such efforts is ultimately limited because there is a low limit to the range of possible angles of incidence, even using mirrors.

Polaroid Corporation sells a photo polymer designated DMP-128®, which Polaroid Corporation can manufacture as a three dimensional hologram, using proprietary processes. The holographic manufacturing process is described, in part, in U.S. Pat. No. 5,576,853. Holographic photo polymers are generally useful for recording photographic images by splitting coherent light into an illumination beam and a reference beam. The illumination beam irradiates the subject. The reflected beam from the subject and the reference beam, which bypasses the subject, irradiate the photo polymer medium, which contains a developable light sensitive photographic composition. The light waves of the two beams interfere, that is, by constructive and destructive interference they produce a standing wave pattern of sinusoidal peaks which locally expose the photographic composition, and nulls which do not locally expose the composition. When the photographic medium is developed, a corresponding interference pattern is recorded in the medium. By illuminating the medium with a coherent reference beam, the image of the subject is reproduced and can be viewed over a range of apparent angles.

The recorded interference pattern of a hologram representing a typical photographic subject is complex because light from all the illuminated points on the subject interfere with the reference beam at all points on the hologram. It would be possible by recording the image of a blank "subject" (effectively by interfering two reference beams), to make a blank hologram in which the interference pattern is more regular. In that case the interference pattern would resemble a diffraction grating but the pitch or resolution of the diffraction grating would be quite fine compared to the pitch of a projection screen having macro sized lenticular elements shaped to bend or refract light in a particular direction from rearward projection tubes.

A three dimensional holographic screen for a projection television was proposed by Polaroid Corporation, as one of many suggestions made during efforts to establish a market for the DMP-128® photo polymer holographic product. The proposal was based on advantages which Polaroid Corporation expected in terms of higher brightness and resolution, lower manufacturing cost, lower weight, and resistance to the abrasion to which two-piece screens are subjected during shipping. Polaroid Corporation never proposed any particular holographic configuration for the volume holographic elements which might make up such a holographic projection television screen, and never even considered the problem of color shift in projection television screens of any type, holographic or otherwise.

Overall, despite years of intensive development to provide a projection television receiver having a screen with a color shift less than 5, even significantly less than 5, or having a color shift as low as 5 for angles of a even greater than 10° or 11°, there have been no advances in solving the color shift problem other than incremental changes in the shapes and positions of lenticular elements and diffusers in conventional projection screens. Moreover, despite suggestions that three dimensional holograms might be useful for projection screens, although for reasons having nothing to do with color shift, there has been no effort to provide projection televisions with three dimensional holographic screens. A long felt need for a projection television receiver having significantly improved color shift performance, which can also be built into a significantly smaller cabinet, has remained unsatisfied.

SUMMARY

A projection television receiver in accordance with the inventive arrangements taught herein provides such a significant improvement in color shift performance, measured in orders of magnitude, that a color shift of 2 or less can be achieved with projection television receivers having angles of incidence a in the range of less than 10° or 11°. Moreover, the color shift performance is so significant that commercially acceptable projection television receivers having angles of incidence up to about 30° can be provided, in much smaller cabinets. These factors are further a increased according to the invention by including one or more mirrors to extend the length of the optical path. The color shift performance of such large α angle receivers is at least as good as conventional small α angle receivers, for example having a color shift of 5, and can be expected to approach or even reach values as low as about 2, as in the small a angle receivers, and in relatively small cabinets.

These results are achieved by forsaking the extruded lens screen technology altogether. Instead, a projection television receiver in accordance with an inventive arrangement has a screen formed by a three dimensional hologram formed on a substrate, for example, a polyethylene film, such as Mylar®.

Such a three dimensional holographic screen was originally developed for its expected advantages in terms of higher brightness and resolution, and lower manufacturing cost, lower weight and resistance to abrasion to which two-piece screens are subjected, for example during shipping. The discovery of the color shift performance of the three dimensional holographic screen came about when testing to determine if the optical properties of the three dimensional screen would be at least as good as a conventional screen. The color shift performance of the three dimensional holographic screen, as measured by equations (I) and (II), was so unexpectedly low as to be shocking. The barriers which limited prior art improvements to incremental steps had been eliminated altogether. Moreover, smaller cabinets with projection geometry characterized by larger α angles of incidence can now be developed.

A projection television having the unexpected properties associated with three dimensional holographic screens, and in accordance with the inventive arrangements taught herein, comprises: at least three image projectors for respective images of different colors; a projection screen formed by a three dimensional hologram disposed on a substrate, the screen receiving images from the projectors on a first side and displaying the images on a second side with controlled light dispersion of all the displayed images; wherein each image projector has an axis of projection and the image projectors are configured such that any two adjacent image projectors have converging axes of projection which define an angle of incidence, α; and, the three dimensional hologram representing a three dimensional array of lenticular elements having a configuration effective for reducing color shift in the displayed images, the screen having a color shift less than or equal to approximately 5 for all the angles of incidence in a range greater than 0° and less than or equal to approximately 30°, as determined by the maximum value obtained from at least one of the following expressions:

$$C(\Theta) = 20 \cdot \log_{10}\left(\frac{red(\Theta)}{blue(\Theta)}\right);$$

$$C(\Theta) = 20 \cdot \log_{10}\left(\frac{green(\Theta)}{blue(\Theta)}\right)$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ. The color shift of the screen can be expected to be less than 5, for example, less than or equal to approximately 4, 3 or even 2.

In terms of the known barrier at an angle of incidence of about 10° or 11°, the color shift of the screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°.

The screen further comprises a light transmissive reinforcing member, for example, of an acrylic material in a layer having a thickness in the range of approximately 2–4 mm. The substrate comprises a highly durable, transparent, water-repellent film, such as a polyethylene terephthalate resin film. The substrate can be a film having a thickness in the range of about 1–10 mils. A thickness of about 7 mils has been found to provide adequate support for the three dimensional hologram. The thickness of the film is not related to performance. The three dimensional hologram has a thickness in the range of not more than approximately 20 microns.

According to an inventive aspect, the projection television has at least one mirror along the optical path between the image projectors and the screen. The image projectors individually or collectively project their respective images onto the mirror, which reflects those images onto the first side of the screen, defining an angle of projection relative to an axis orthogonal with the screen for each image. The projection screen collects and redirects the images reflected thereon by the mirror such that the images displayed on the second side of the screen are directed at an angle of display relative to the axis orthogonal with the screen, wherein the angle of display ranges from 0 to 5°. The holographic screen collects incident light over a range of angles of incidence and emits the light more nearly on a line perpendicular to the orthogonal axis.

According to another inventive aspect, the color shift performance of the projection screen can be further improved by stacking a plurality of holographic screen elements and/or collimating elements. For example, a holographic screen can be backed by vertical and horizontal linear Fresnel lenses for achieving a desired variation in light transmission properties across a span of vertical or horizontal viewing angles. Alternatively or in addition, a plurality of holographic screen elements having a variation in light transmission properties across a span of viewing angles can be stacked. According to a practical embodiment, at least two holographic elements are stacked, one providing a predetermined variation across a vertical span and the other providing a predetermined variation across a horizontal span. In this manner, the brightness of the image across the range of useful viewing angles can be adjusted and optimized to take full advantage of the available illumination. In addition, stacking of holographic elements and/or collimating elements can accommodate a variety of performance domains at a favorable cost, because linearly varying elements can be manufactured at a lower cost than circularly varying elements. For example, linearly varying fresnel elements can be embossed or roller extruded, at a cost as low as 25% of the cost of a circular fresnel. Similarly, a linearly varying holographic master is less complicated and less expensive than a circular one defining variations in two dimensions.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the spirit and scope of the appended claims. In the drawings.

DESCRIPTION OF THE PREFERRED EMBODIMENTS

Figure 1:
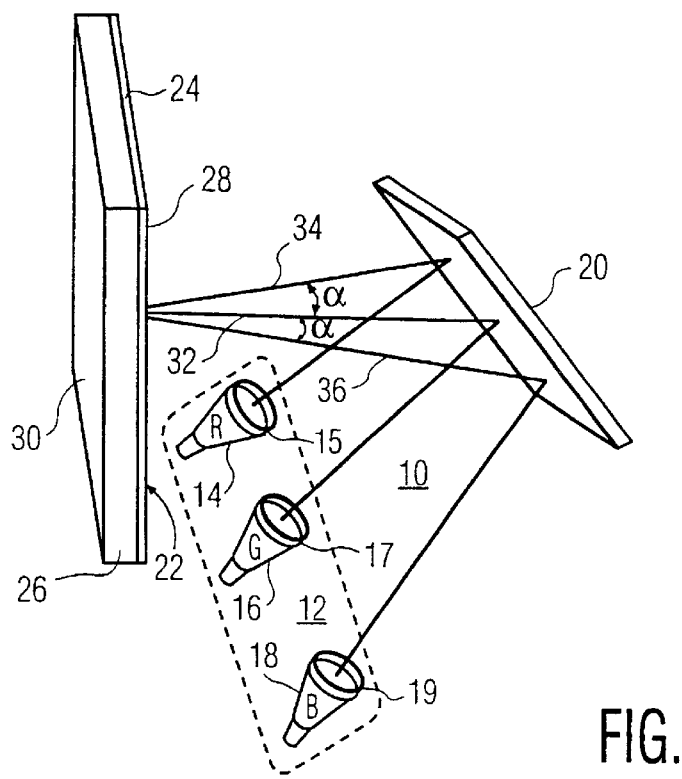
FIG. 1 is a diagrammatic representation of a projection television in accordance with the inventive arrangements taught herein.

A projection television receiver 10 is illustrated diagrammatically in FIG. 1. An array 12 of projection cathode ray tubes 14, 16 and 18 provide red, green and blue images respectively. The cathode ray tubes are provided with respective lenses 15, 17 and 19. The projected images are reflected by a mirror 20 onto a projection screen 22. Additional mirrors can also be utilized, depending on the particular geometry of the optical paths. The green cathode ray tube 16 projects the green image along an optical path 32, which in this example is oriented substantially orthogonal to screen 22. In other words, the centerline of the optical path is at right angles to the screen. The red and blue cathode ray tubes have respective optical paths 34 and 36, which converge toward the first optical path 32 in a non orthogonal orientation defining angles of incidence α. The angles of incidence introduce the problem of color shift.

The screen 22 comprises a three dimensional hologram 26 disposed on a substrate 24. Hologram 26 is a print of a master hologram substantially forming a diffraction pattern that manages the distribution of light energy from the three projectors 14, 16, 18, and can be made variable across the width and/or height of the screen. In a preferred arrangement, the hologram is a "center only" hologram that tends to reorient light incident on the hologram from a range of angles of incidence and to emit the light more directly forwardly. The screen receives images from the projectors on a first, entrance surface side 28 and displays the images on a second, exit surface side 30, with controlled light dispersion of all the displayed images.

The substrate is preferably a highly durable, transparent, water-repellent film, such as a polyethylene terephthalate resin film. One such film is available from E.I. du Pont de Nemours & Co. under the trademark Mylar®. The film substrate has a thickness in the range of about 1–10 mils, equivalent to about 0.001–0.01 inches or about 25.4–254 microns. A film having a thickness of about 7 mils has been found to provide adequate support for the three dimensional hologram disposed thereon. The thickness of the film does not affect screen performance in general or color shift performance in particular, and films of different thickness may be utilized. The three dimensional hologram 26 has a thickness of not more than approximately 20 microns.

Three dimensional holographic screens are available from at least two sources. Polaroid Corporation utilizes a proprietary, wet chemical process to form three dimensional holograms in its DMP-128 photo polymer material. The process includes forming a diffractive holographic pattern in the photo polymer material, which pattern can include variations in screen gain across the range of horizontal and/or vertical viewing angles. A master hologram can be prepared by exposing photo polymer holographic media to coherent light including a reference beam and a beam reflected from a planar pattern having light-to-dark variations corresponding to the desired variation in gain.

A preferred embodiment of the three dimensional holographic screens used in the projection television receivers described and claimed herein were manufactured by the Polaroid Corporation wet chemical process, in accordance with the following performance specifications:

Horizontal half viewing angle: 38°±3°,
Vertical half viewing angle: 10°±1°,
Screen gain: ≧8,
Color shift: ≦3, where the horizontal and vertical viewing angles are measured conventionally, screen gain is the quotient of light intensity directed from the source toward the rear of the viewing surface, and light intensity from the front of the viewing surface toward the viewer, measured orthogonal to the screen, and color shift is measured as described above. The extraordinary color shift performance of the three dimensional holographic projection screen was, as explained in the Summary, wholly unexpected.

Figure 2:
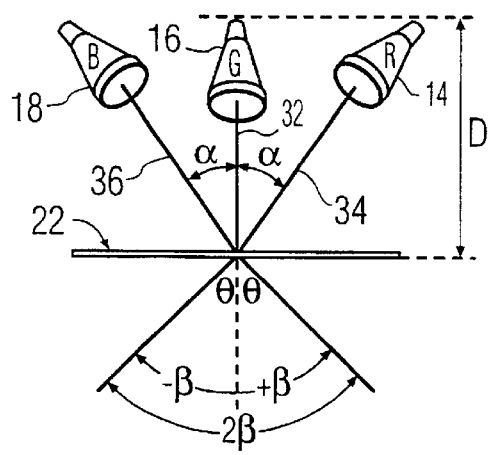
FIG. 2 is a simplified diagram of projection television geometry useful for explaining the inventive arrangements.

FIG. 2 is a simplified projection television illustration, omitting the mirror and lenses, for explaining color shift performance. The optical axes 34 and 36 of the red and blue cathode ray tubes 14 and 18 are aligned symmetrically at angles of incidence $\alpha$ with respect to the optical axis 32 of the green cathode ray tube 16. The minimum depth D of a cabinet is determined by the distance between the screen 22 and the rear edges of the cathode ray tubes. It will be appreciated that if the angle $\alpha$ is to become smaller, the cathode tubes must be placed closer together and/or must be spaced further from the screen to provide clearance for the tubes. At a sufficiently small angle $\alpha$, such interference cannot be avoided. This undesirably increases the minimum depth D of a cabinet. Conversely, as the angle $\alpha$ gets larger, the cathode ray tubes can be moved closer to the screen 22, reducing the minimum depth D of a cabinet.

On the viewing side of the screen 22, two horizontal half viewing angles are designated $-\beta$ and $+\beta$. Together, a total horizontal viewing angle of $2\beta$ is defined. The half viewing angles may typically range from $\pm 40°$ to $\pm 60°$. Within each half angle are a plurality of specific angles $\theta$, at which color shift can be measured and determined, in accordance with equations (I) and (II) explained above.

In terms of the known barrier at an angle of incidence of about 10° or 11°, the color shift of the three dimensional holographic screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°. It is expected that a color shift of less than or equal to approximately 2, as in the first subrange, can also be achieved in the second subrange of larger angles of incidence.

Figure 3:
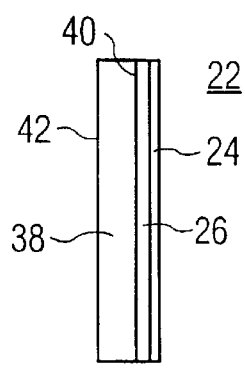
FIG. 3 is a side elevation of a reinforced projection screen according to the inventive arrangements.

With reference to FIG. 3, the substrate 24 comprises a transparent film, such as Mylar®, as described above. The photo polymer material from which the three dimensional hologram 26 is formed is supported on the film layer 24. A suitable photo polymer material is DMP-128®.

The screen 22 may further comprise a light transmissive reinforcing member 38, for example, of an acrylic material, such as polymethylmethacrylate (PMMA). Polycarbonate materials can also be used. The reinforcing member 38 is presently a layer having a thickness in the range of approximately 2–4 mm. The screen 22 and the reinforcing member are adhered to one another throughout the mutual boundary 40 of the holographic layer 26 and the reinforcing member 38. Adhesive, radiation and/or thermal bonding techniques may be utilized. The surface 42 of the reinforcing layer may also be treated, for example by one or more of the following: tinting, anti-glare coatings and anti-scratch coatings.

Figure 4:
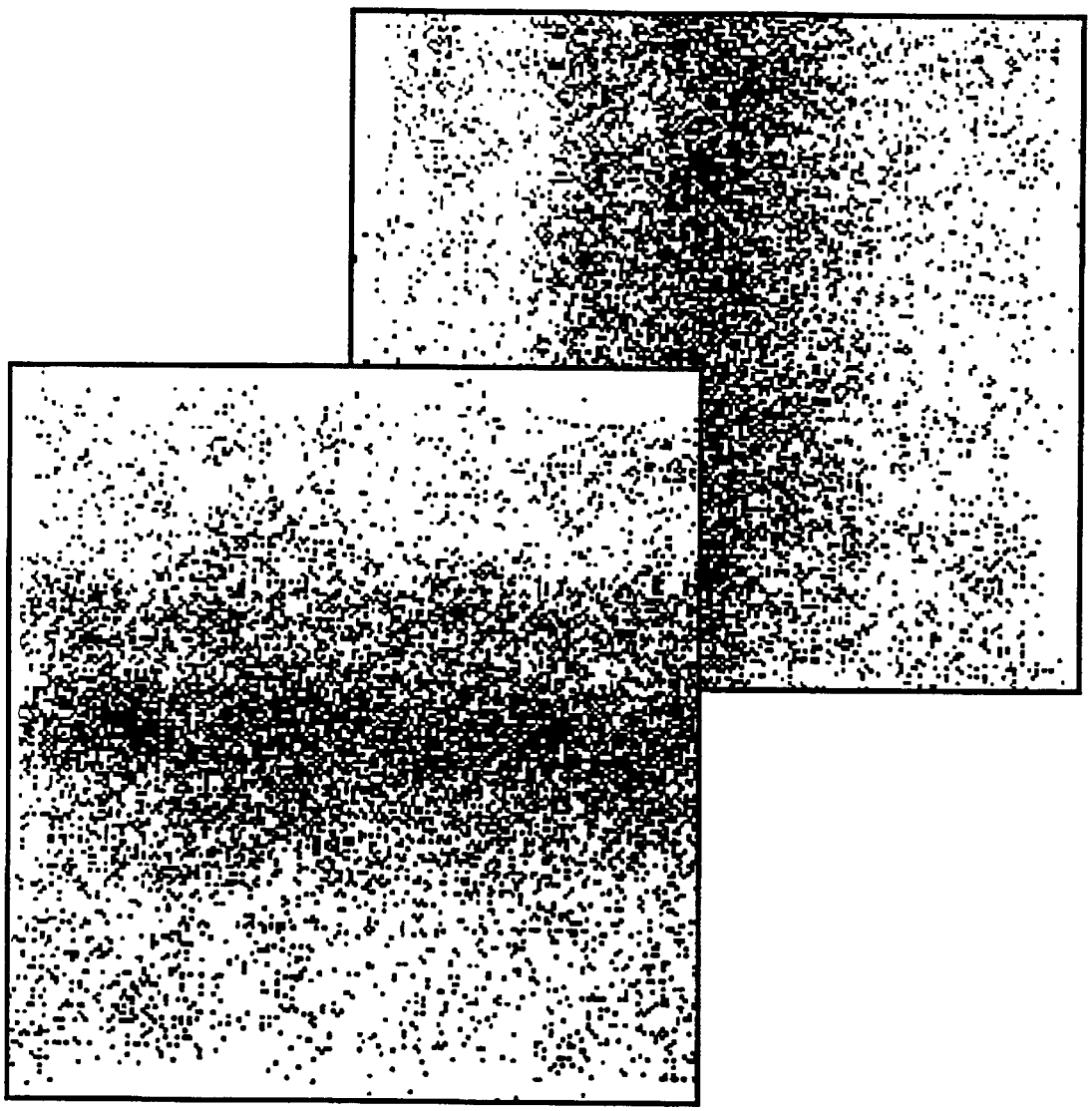
FIG. 4 is a schematic representation of an alternative embodiment of a projection screen with two superimposed holograms containing gain variations across horizontal and vertical viewing angles, respectively.

Various surfaces of the screen and/or its constituent layers may be provided with other optical lenses or lenticular arrays to control aspects of the projection screen bearing on performance characteristics other than color shift performance, as is known to do with conventional projection screens, without impairing the improved color shift performance of the three dimensional holographic projection screen. FIG. 4 illustrates a first such variation wherein at least two holograms are superimposed or stacked. According to the example shown, a first hologram having a horizontal gain variation across a viewing field of $\pm 40°$ is stacked with a second hologram having a vertical gain variation across a field of $\pm 20°$. The gain variations are suggested by shading in the drawing, but when not illuminated the actual holographic elements simply appear to be diffuse across their surfaces. The result of superimposing horizontal and vertical gain variation holograms is substantially equivalent to a center-only hologram; however, the brightness level is varied at different rates across the horizontal span and the vertical span, because the horizontal span is substantially larger than the vertical span.

Figure 5:
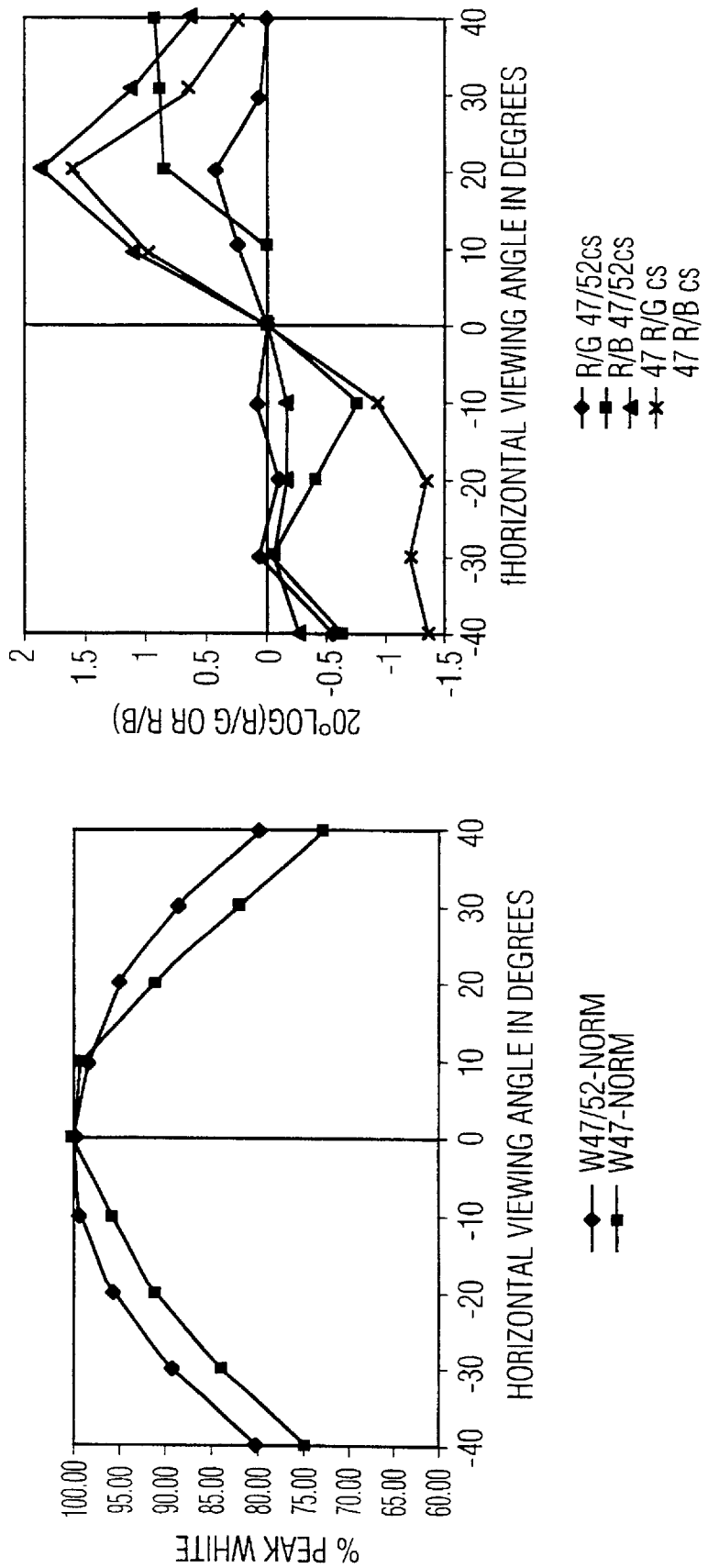
FIG. 5 is a graphic representation of the proportion of peak white brightness as a function of horizontal viewing angle, using a horizontally varied holographic element with and without the stacked vertically varying holographic element.

FIG. 5 is a graph of measured screen brightness as a percentage of peak white brightness through a horizontal viewing span of $\pm 40°$, at a point in the center of the screen. The two lines on the graph represent the brightness using only a horizontally varying hologram and brightness using stacked horizontally and vertically varying holograms. The horizontal brightness variation with stacked holograms is substantially equal or slightly improved over the performance of the horizontal hologram alone.

In designing a holographic screen for a variety of performance domains, it can be difficult to make a screen that implements all desired performance characteristics at once. Stacking allows the separate handling of different demands, such as vertical and horizontal variations in gain. This arrangement is not limited to two stacked holograms, but is also applicable to additional stacked holograms, for example to control other aspects of light transmission through the screen.

Figure 6:
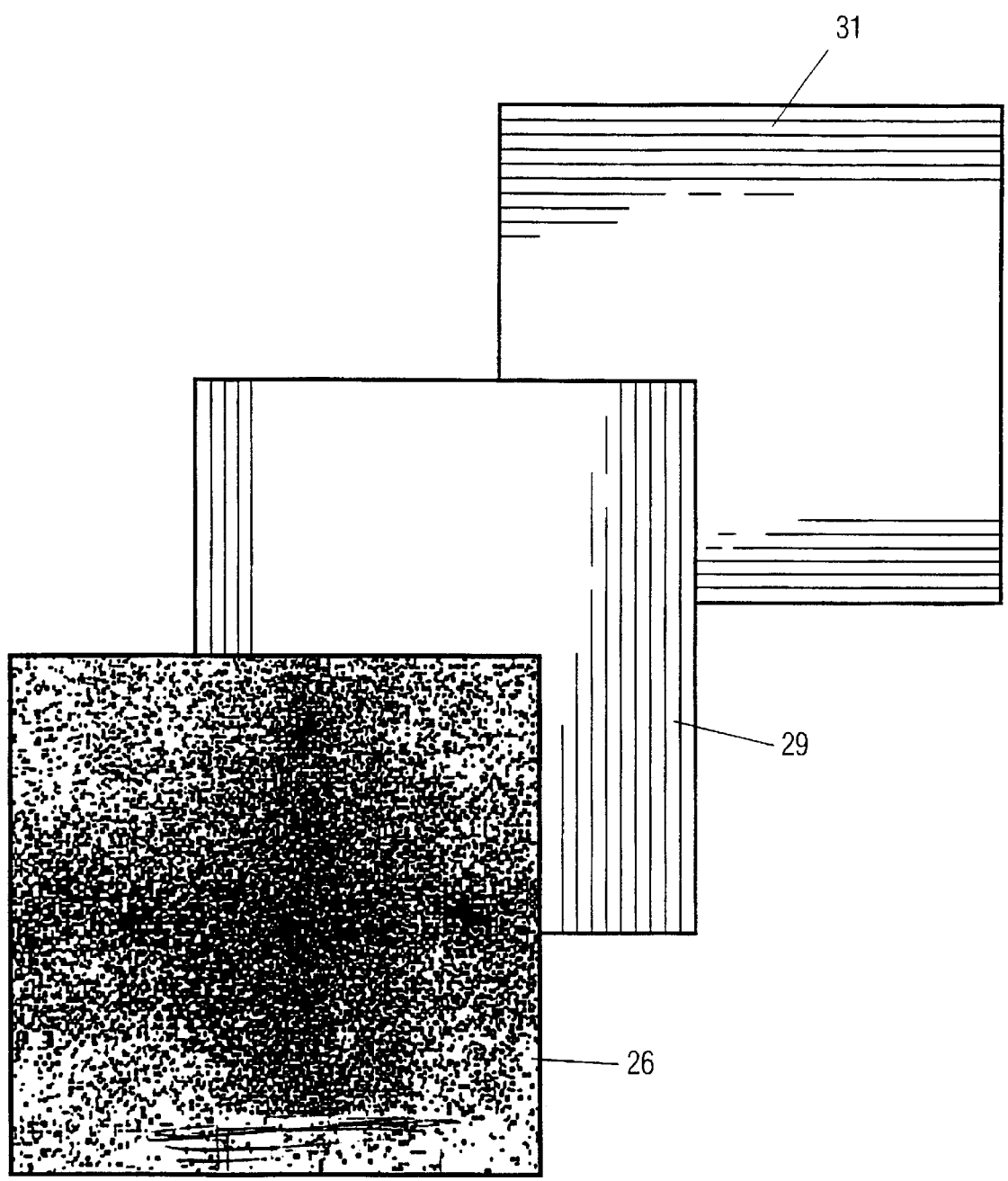
FIG. 6 is a schematic drawing of an alternative embodiment having stacked holographic and collimating screen layers.

FIG. 6 illustrates a further variation in which a center-only hologram (i.e., having horizontal and vertical gain variation) is stacked with linear fresnels for effecting horizontal and rotated vertical collimation. This embodiment has favorable cost implications in that linear fresnels can be embossed or roller extruded inexpensively as compared with a circular fresnel. A circular fresnel can account for as much as 60% of the cost of a conventional screen. A linear fresnel costs about 25% of the cost of a circular one. Therefore, a 30% cost savings is possible (i.e., (25%+25%)*60%=30%). As with the horizontal and rotated holograms as discussed above, the linear fresnels can be varied across the horizontal and/or vertical viewing span as necessary, for example to vary the focal lengths independently in the vertical and horizontal spans. The two stacked linear fresnels can be placed in either order behind the holographic element.

Another aspect of the invention is the ability to design rear projection televisions having a significantly reduced cabinet depth. Particularly, the rear projection televisions of the invention may incorporate a plurality of image projectors wherein none of the image projectors has an axis of projection coincident with the orthogonal axis of the screen. Rather, the aspects of the invention may provide for a rear projection television wherein each image projector therein has an axis of projection that defines an angle of projection, $\phi$, relative to the orthogonal axis of the screen. The televisions of the invention are capable of correcting for angles of projection, $\phi$, of up to 30° such that the images displayed on the screen will be directed at an angle of display relative to the orthogonal axis of the screen, wherein the angle of display ranges from 0 to 5°.

Figure 7:
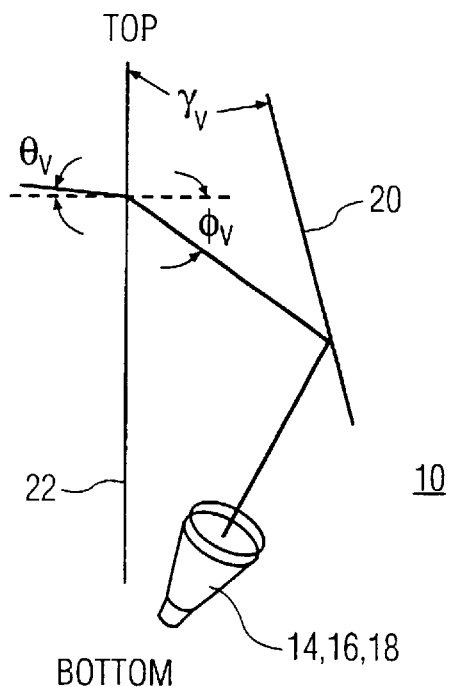
FIG. 7 is another simplified diagram of projection television geometry useful for explaining the inventive arrangements.

For example, the television designs of the invention are capable of accommodating angles of projection comprising an extreme up angle, thereby facilitating a significant reduction in the required cabinet depth. FIG. 7, depicts a mirror 20 oriented at an angle $\gamma_v$ in a vertical plane with screen 22 such that the images projected onto mirror 20 by projection cathode ray tubes 14, 16 and 18 are reflected onto projection screen 22 at an angle of projection comprising an extreme up angle, $\phi_v$, in the vertical plane. Screen 22 redirects the images reflected thereon such that the images transmitted through screen 22 are directed at an angle of display, $\theta_v$, in the vertical plane of from 0 to 5°, preferably between 3 and 5°, wherein the images are reflected on screen 22 with an angle of projection comprising an extreme up angle, $\phi_v$, of from 10 to 30°, preferably from 15 to 30°, most preferably at least 15°.

Figure 8:
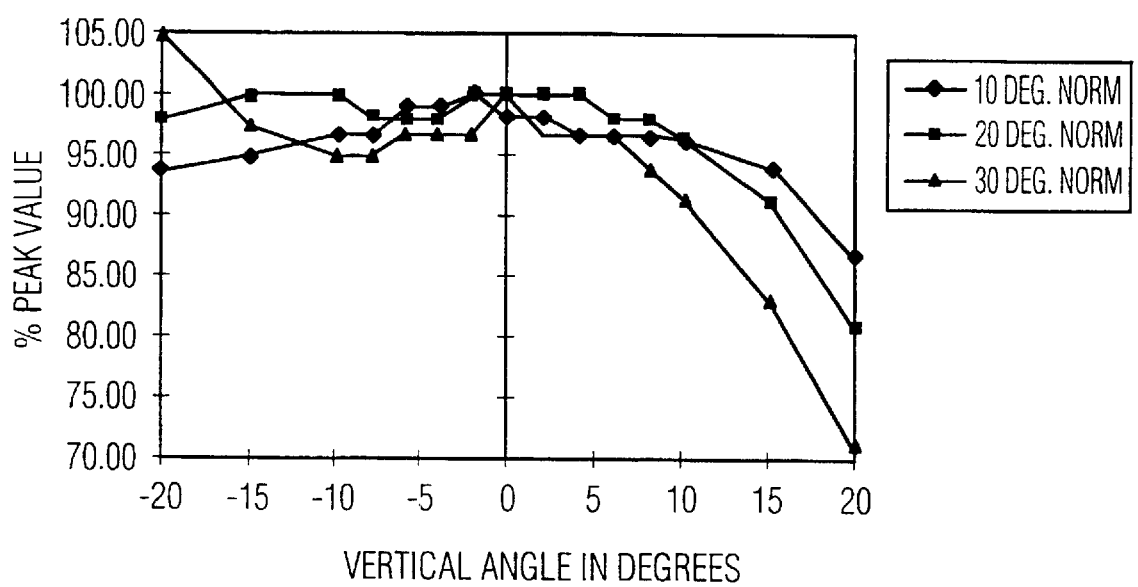
FIG. 8 is a graph of measured brightness as a percentage of peak white brightness through a vertical viewing span of ±20°, at a point in the center of the screen, for an angle of projection, $\phi_v$, in the vertical plane of 10°, 20° and 30°.

This aspect of the invention was tested for three different angles of projection, $\phi_v$, namely 10°, 20° and 30°. Specifically, light was reflected onto the back of screen 22 at a given angle of projection, $\phi_v$, while measurements were taken of the intensity of the light transmitted through screen 22 at different vertical viewing angles. The results of these tests are displayed in graphical form in FIG. 8. Particularly, FIG. 8 is a graph of the measured brightness as a percentage of peak white brightness through a vertical viewing span of ±20°, at a point in the center of the screen.

Figure 9:
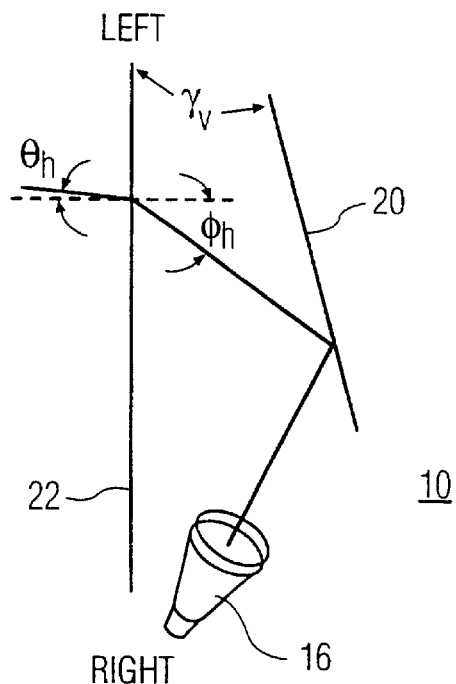
FIG. 9 is another simplified diagram of projection television geometry useful for explaining the inventive arrangements.

Another aspect of the invention, is the ability to use a mirror 20 which facilitates angles of projection comprising extreme side approach angles. FIG. 9, depicts mirror 20 oriented at an angle $\gamma_h$ in a horizontal plane with screen 22 such that the image projected onto mirror 20 by projection cathode ray tube 16 is reflected onto projection screen 22 at an angle of projection comprising an extreme side approach angle, $\phi_h$, in the horizontal plane. Screen 22 redirects the images reflected thereon such that the image transmitted through screen 22 is directed at an angle of display, $\theta_h$, of from 0 to 5°, preferably between 3 and 5°, wherein the image is reflected on screen 22 at an angle of projection comprising an extreme side approach angle, $\phi_h$, of from 10 to 30, preferably from 15 to 30°, most preferably of at least as large as 15°.

Figure 10:
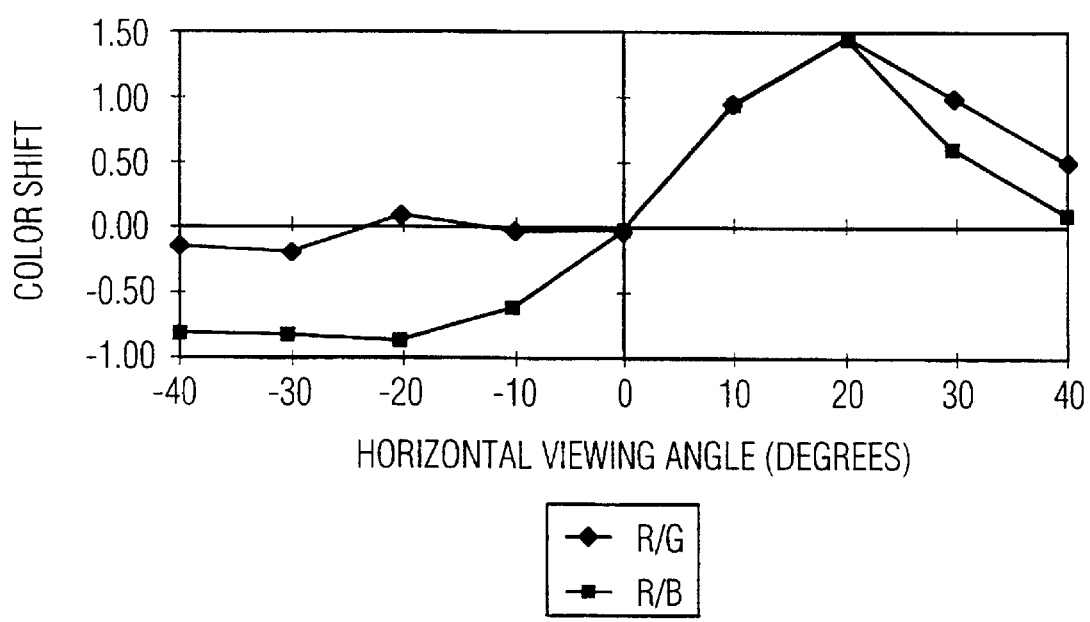
FIG. 10 is a graph of the red/green and red/blue color shift observed through a horizontal viewing span of ±40°, for an angle of projection, $\phi_h$, in the horizontal plane of 0°.
Figure 11:
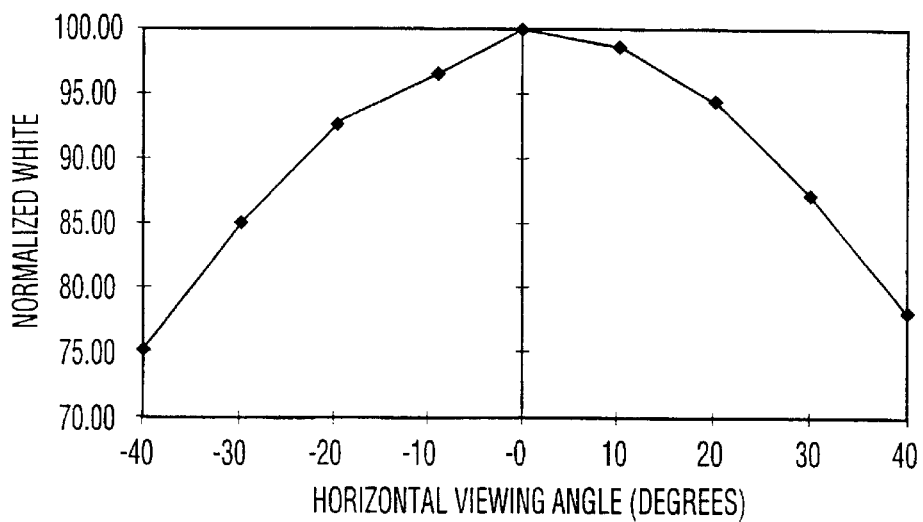
FIG. 11 is a graph of measured screen brightness as a percentage of peak white brightness through a horizontal viewing span of ±40°, at a point in the center of the screen, for an angle of projection, $\phi_h$, in the horizontal plane of 0°.
Figure 12:
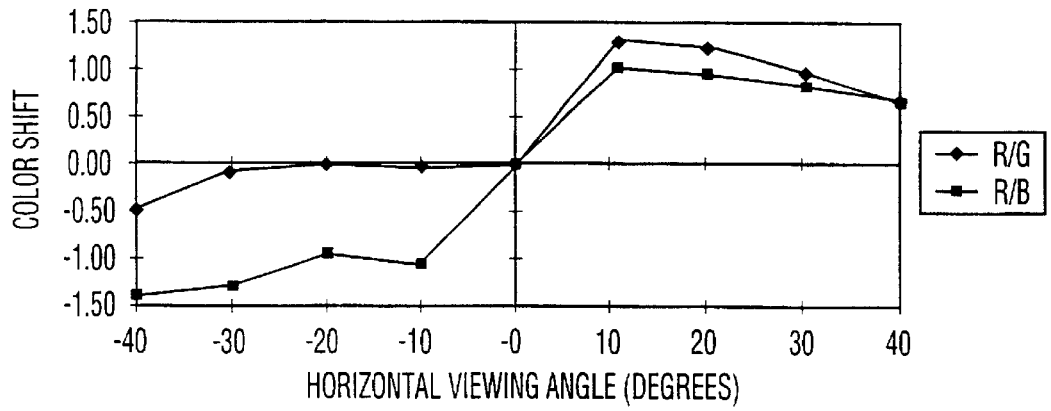
FIG. 12 is a graph of the red/green and red/blue color shift observed through a horizontal viewing span of ±40°, for an angle of projection, oh, in the horizontal plane of 15°.
Figure 13:
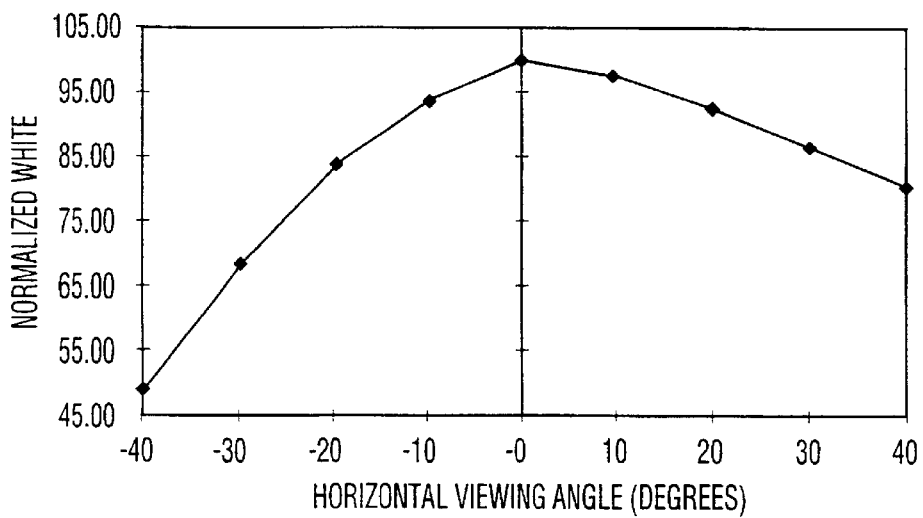
FIG. 13 is a graph of measured screen brightness as a percentage of peak white brightness through a horizontal viewing span of ±40°, at a point in the center of the screen, for an angle of projection, $\phi_h$, in the horizontal plane of 15°.
Figure 14:
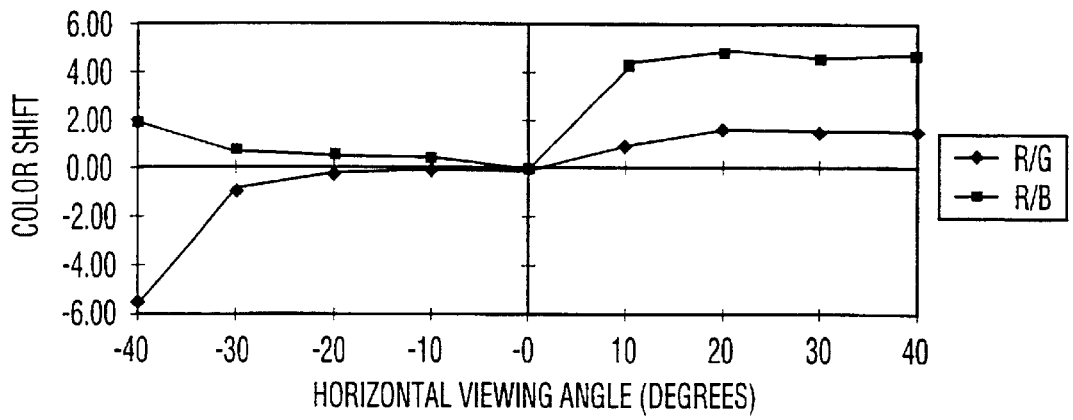
FIG. 14 is a graph of the red/green and red/blue color shift observed through a horizontal viewing span of ±40°, for an angle of projection, $\phi_h$ in the horizontal plane of 30°.
Figure 15:
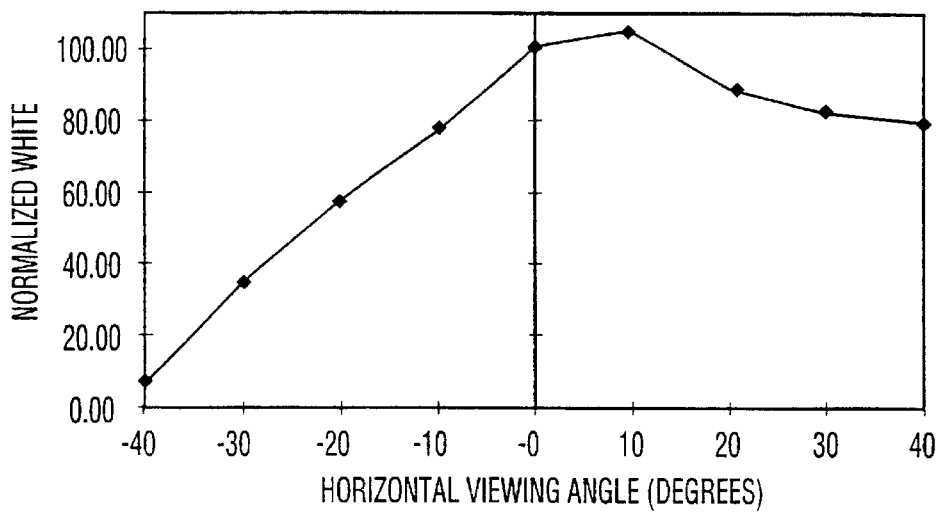
FIG. 15 is a graph of measured screen brightness as a percentage of peak white brightness through a horizontal viewing span of ±40°, at a point in the center of the screen, for an angle of projection, $\phi_h$, in the horizontal plane of 30°.
Figure 16:
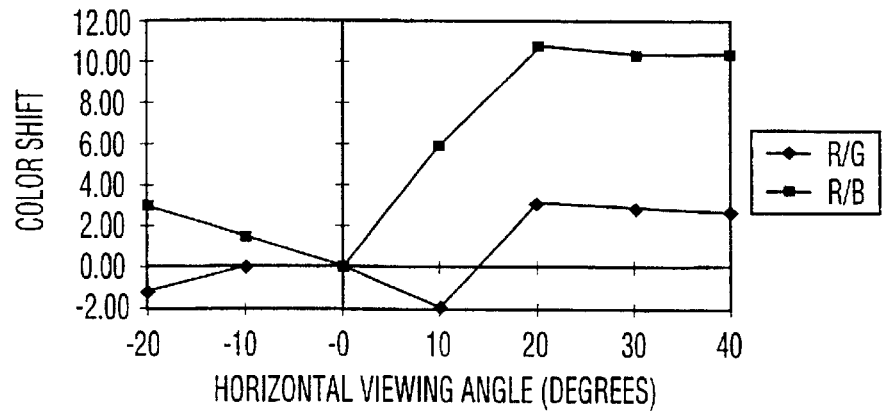
FIG. 16 is a graph of the red/green and red/blue color shift observed through a horizontal viewing span of ±40°, for an angle of projection, $\phi_h$, in the horizontal plane of 45°.
Figure 17:
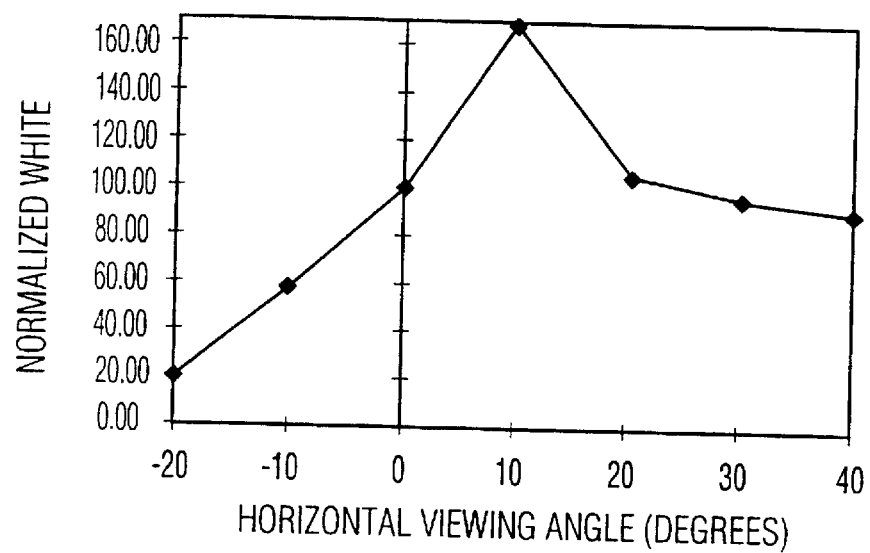
FIG. 17 is a graph of measured screen brightness as a percentage of peak white brightness through a horizontal viewing span of ±40°, at a point in the center of the screen, for an angle of projection, $\phi_h$, in the horizontal plane of 45°; and, FIG. 18 is another simplified diagram of projection television geometry useful for explaining the inventive arrangements.

This aspect of the invention was tested for four extreme side approach angles, $\phi_h$, namely 0°, 15°, 30° and 45°. Specifically, light was reflected onto the back of screen 22 at a given angle of projection, $\phi_h$, while measurements were taken of the intensity of the light transmitted through screen 22 and of the red/green and red/blue color shift as a function of the horizontal viewing angle. The results of these tests are displayed in graphical form in FIGS. 10 through 17. Specifically, FIGS. 10 and 11 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 0°. FIGS. 12 and 13 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 15°. FIGS. 14 and 15 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 30°. FIGS. 16 and 17 are a graph of the red/green and red/blue color shift observed through a horizontal viewing span of ±40° and a graph of measured screen brightness as a percentage of peak white brightness through a horizontal viewing span of ±40°, at a point in the center of the screen; respectively, for angle $\phi_h$ of 45°.

Figure 18:
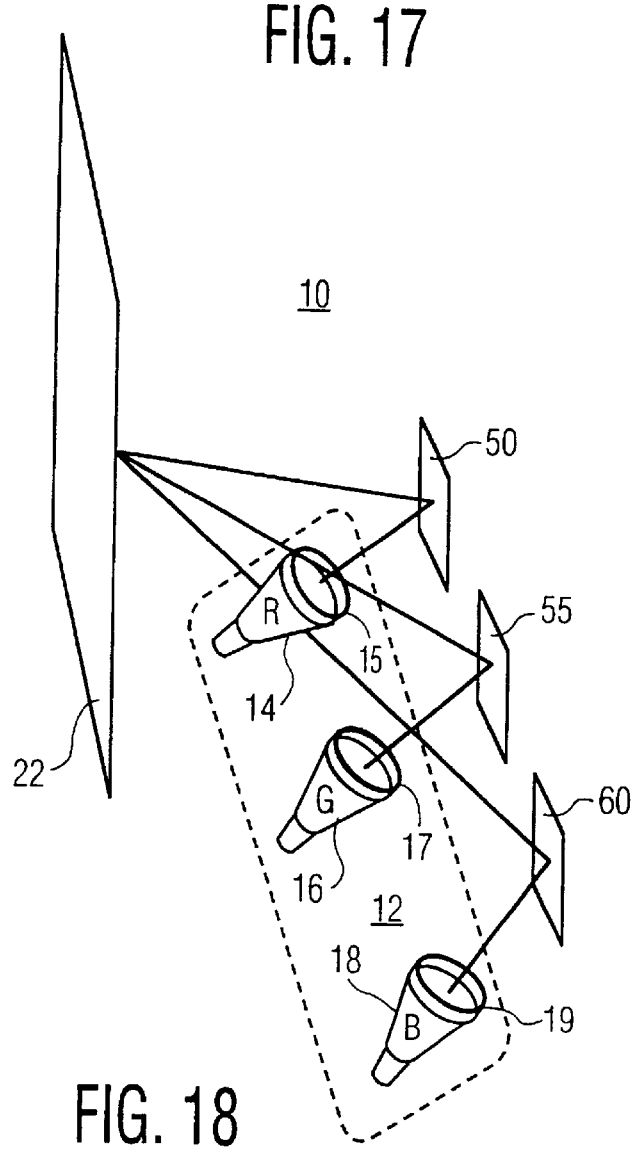

In another variation of the invention, each individual projection cathode ray tube cooperates with a separate at least one mirror, wherein the separate mirrors are oriented so the respective images reflected thereby collectively converge on the same spot on the back of the screen. FIG. 18, depicts a preferred example of this variation of the invention, wherein mirror 20 is replaced by mirrors 50, 55 and 60. Mirrors 50, 55 and 60 are individually oriented such that they reflect light along optical axes that converge at the center of screen 22, the images being projected by projection cathode ray tubes 14, 16 and 18, respectively. The concepts of the invention, and in particular the holographic screen, permit mirrors 50, 55 and 60 whose optical axes need not be extremely close to orthogonal to screen 22. Rather, using the concepts of the invention, the images reflected onto screen 22 by mirrors 50, 55 and 60 may be incident thereto with an angle of projection, $\phi$, of 0 to 30°, preferably 15 to 30°, most preferably about 15°.

These and other aspects of the invention which will be readily apparent to those skilled in the art in view of the disclosures made herein may facilitate the design and production of rear projection screen televisions having cabinet sizes smaller than would have been considered possible.

The invention now having been disclosed in connection with the foregoing exemplary embodiments, additional embodiments will now be apparent to persons skilled in the art. The invention is not intended to be limited to the embodiments specifically mentioned, and accordingly reference should be made to the appended claims rather than the foregoing discussion, to assess the spirit and scope of the invention in which exclusive rights are claimed.

What is claimed is:

1. A projection television, comprising:

a plurality of image projectors for respective images of different colors, wherein each image projector has an axis of projection, wherein any two adjacent image projectors define a pair of image projectors, and wherein each pair of image projectors have axes of projection defining an angle of incidence;

a projection screen formed by at least one hologram disposed on a substrate superimposed on at least one light transmissive panel, said screen receiving images from said projectors on a first side and displaying said images on a second side with controlled light dispersion of said displayed images;

at least one mirror along an optical path between the projectors and the projection screen, the at least one mirror being oriented to reflect images from the projectors onto said first side, defining an angle of projection for each image within a range of approximately ±30° relative to an axis orthogonal with the screen;

said projection screen redirecting the images reflected thereon such that the images displayed on said second side are directed at an angle of display within a range of display angles relative to the axis orthogonal with the screen;

said screen forming an interference array with optical properties varying horizontally and vertically across a field of view, the screen having a color shift less than or equal to approximately five for all said angles of projection in said range, as determined by the maximum value obtained from at least one of the following expressions:

$$C(\theta) = 20 \cdot \log_{10}\left(\frac{red(\theta)}{blue(\theta)}\right)$$

$$C(\theta) = 20 \cdot \log_{10}\left(\frac{green(\theta)}{blue(\theta)}\right),$$

θ is any angle within said range of horizontal viewing angles, C (θ) is the color shift at angle θ, red (θ) is the red luminance level at angle θ, blue (θ) is the blue luminance level at angle θ and green (θ) is the green luminance level at angle θ.

2. The projection television of claim 1, wherein said range of projection angles is approximately 15° to 30° relative to said axis orthogonal with the screen and approximately −15° to −30° relative to said axis orthogonal with the screen.

3. The projection television of claim 1, wherein said range of projection angles is greater than or equal to approximately 15° relative to said axis orthogonal with the screen and less than or equal to approximately −15° relative to said axis orthogonal with the screen.

4. The projection television of claim 1, wherein the at least one mirror is oriented between the plurality of image projectors and the projection screen such that said axes of projection are disposed at an extreme up angle, defined as an angle between a plane defined by said screen and any one of said axes of projection of said image projectors, in the range of approximately 10° to 30°.

5. The projection television of claim 1, wherein the at least one mirror is oriented between the plurality of image projectors and the projection screen such that said axes of projection are disposed at an extreme side angle, defined as an angle between a plane defined by said screen and any one of said axes of projection of said image projectors, in the range of approximately 10° to 30°.

6. The projection television of claim 1, wherein said at least one mirror comprises at least one separate mirror for each one of said image projectors.

7. The projection television of claim 1, wherein said at lest one hologram comprises a first hologram controlling said light dispersion of each of red and blue images in at least one of two different directions.

8. The projection television of claim 1, wherein said screen comprises first and second holograms stacked on one another, said first hologram controlling said light dispersion of each of red and blue images in one of two different directions and said second hologram controlling said light dispersion of each of said red and blue images in the other of said two different directions.

9. The projection television of claim 1, wherein said screen has the following performance specifications:

Horizontal half viewing angle: 38°±3°

Vertical half viewing angle: 10°±1°

Screen gain: ≧8

Color shift: ≦3.

* * * * *